United States Patent Office 3,485,994
Patented Dec. 23, 1969

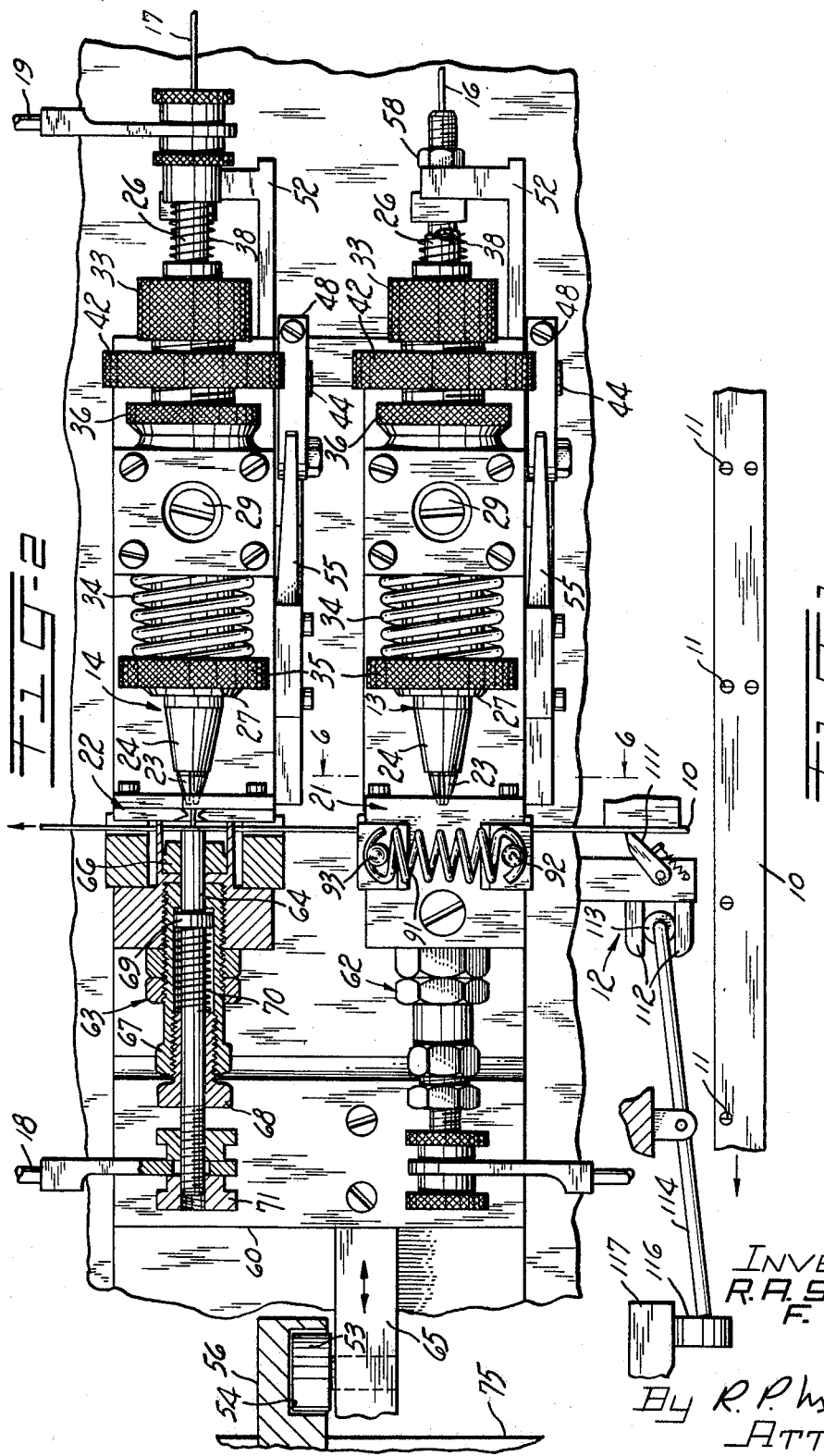

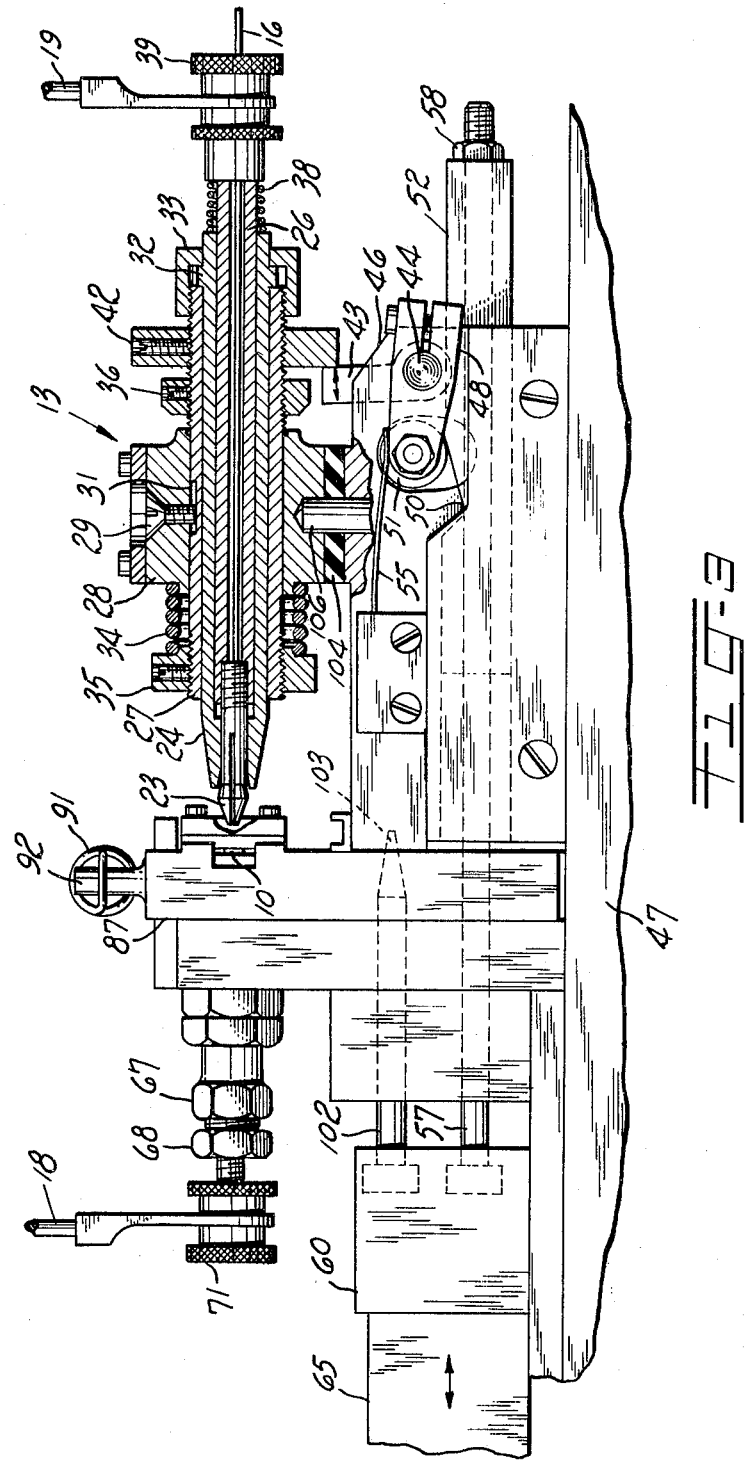

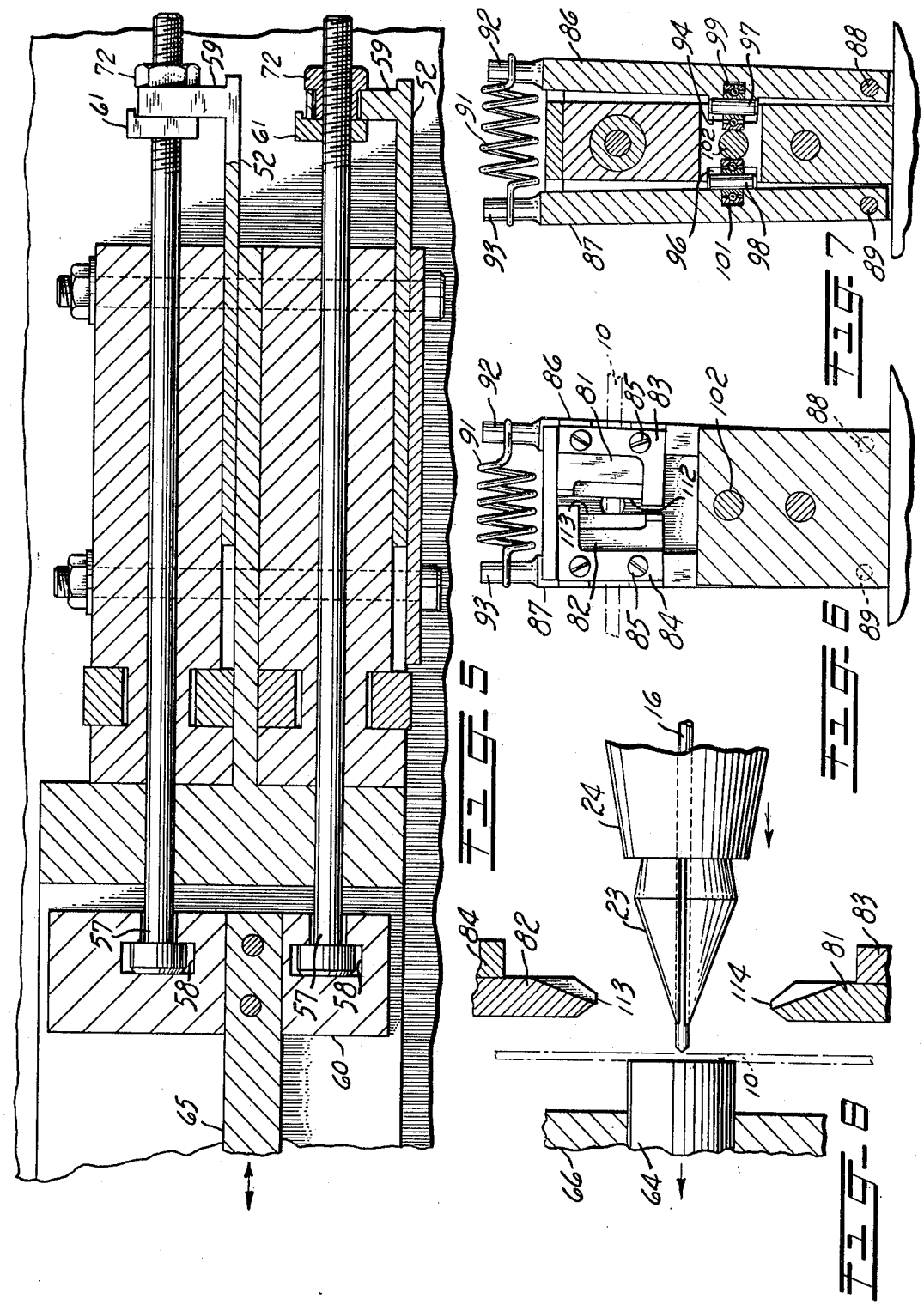

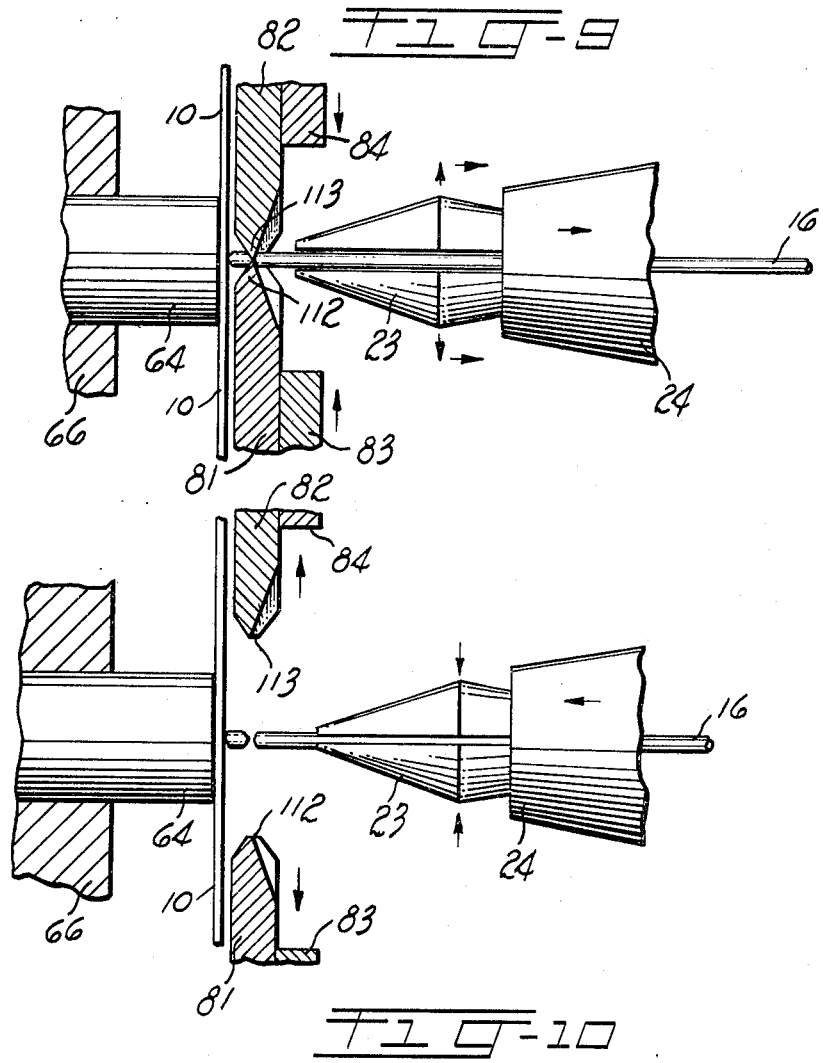

3,485,994
APPARATUS FOR RESISTANCE WELDING SPACED CONTACT ELEMENTS ONTO A STRIP OF MATERIAL
Roger A. Swajger, Wayne, and Frank Wahl, North Bergen, N.J., assignors to Western Electric Company, Incorporated, New York, N.Y., a corporation of New York
Filed Oct. 12, 1966, Ser. No. 594,961
Int. Cl. B23k *11/22*
U.S. Cl. 219—103                        8 Claims

ABSTRACT OF THE DISCLOSURE

Spaced contacts are welded onto a strip by reciprocating welding heads to advance lengths of contact material between cutter devices and into engagement with the strip. The engaged ends of the contact material are welded to the strip whereafter the welding heads are reversed to move the welded strip against the sides of the cutting devices which are subsequently operated to sever the lengths of contact material to leave spaced contact welded to the strip. The lengths of the contacts are determined by the distance between the sides of the cutter devices and the edges of blades mounted in the cutter device.

---

This invention relates to apparatus for resistance welding spaced contact elements onto a strip of material, and more particularly to apparatus for reciprocating the end of a length of contact material through a pair of open, severing jaws, welding the end of the contact material onto a strip, and then moving the welded strip against the side faces of the severing jaws whereafter the jaws are closed to sever the contact material.

In the manufacture of certain types of relays, switches and other circuit makers and breakers, spring metal switch blades having precious metal contact elements are used to establish or interrupt the circuits. The precious metal is welded onto the switch blade to provide a circuit making element having good electrical conductivity and wear resistant properties. In fabrication, individual switch blades can be formed and the individual contact elements welded onto the blades. In the alternative, the contact elements can be welded onto a continuous strip of spring metal and then the strip can be severed to provide the individual switch blades.

Where individual contacts are welded onto a continuous strip, it is necessary that a welding apparatus be provided that can be readily disassembled for replacement of worn or broken parts. It may be appreciated that apparatuses of this type are subject to wear and breakage due to the fact that apparatus are run at high speeds and the components are subject to wear and breakage as a result of the various metal feeding operations required. Further these welding apparatuses should include facilities that are readily adjustable to weld different length contact elements onto the continuous strip. Further, in order to insure the maximum output of the apparatus with the minimum amount of maintenance, the component mechanisms of the apparatus must be positive acting to provide welded contact elements on the switch blades that are of consistent good quality.

An object of the present invention resides in a new and improved apparatus for welding spaced precious metal contact elements onto a strip of spring metal.

Another object of the invention resides in a welding machine that is positive acting but also may be easily adjusted to compensate for wear.

Concomitant with the last object, it is a further object to provide a welding machine that may be readily disassembled for replacement of worn or broken parts.

A further object of the invention resides in a welding machine in combination with a pair of open cutter blades wherein a collet-like welding electrode advances a strip of precious metal through the open cutter blades, welds the precious metal to a spring metal strip, and then withdraws relative to the strip of precious metal to allow the cutter blades to sever the precious metal.

Along with this last object is a further object to provide cutters that are selectively positioned to control the length of material that is welded onto the spring metal strip.

An additional object of the invention is to provide a welding machine having strip feeding, welding, and cutting facilities that are actuated by a single reciprocation of a slide member.

With these and other objects in view, the present invention contemplates a welding machine having facilities for feeding and welding a first strip onto a second strip whereafter the welded strip is severed leaving a contact element welded onto a second strip. More particularly, a single reciprocation of a slide device releases a feed collect which advances a projecting end of the first contact metal strip into engagement with the second spring metal strip. This engagement is followed by the application of welded energy through the strips to weld the end of the first strip onto the second strip. Upon reversal of movement of the slide device, the collet moves back to draw the welded second strip into engagement with the side faces of a pair of cutters so that further movement of the collet tends to slide the collet along and relative to the now held welded first strip. After the collet completes its movement, a further movement is imparted to the slide device to actuate the cutters to sever the welded portion of the first strip. The severed welded end of the first strip serves as a contact element which may be subsequently shaped, and then the continuous spring metal strip may be severed to form contact springs or switch blades for use in the manufacture of relays or other circuit makers and breakers.

Other objects and advantages of the present invention will be apparent from the following detailed description when considered in conjunction with the accompanying drawings, wherein:

FIG. 1 shows a section of spring metal stock onto which are welded a number of metallic contact elements by the welding appparatus shown in the other figures;

FIG. 2 is a top plan view of a welding apparatus embodying the principles of the present invention for welding contact elements onto the spring metal stock;

FIG. 3 is a side elevational view of one of a pair of welding heads shown in FIG. 2 with the head in a partially retracted position to particularly illustrate the action of a mechanism for advancing and retracting the head;

FIG. 5 is a sectional view taken along line 5—5 of FIG. 4 showing further details of the mechanism for advancing and retracting the welding heads;

FIG. 6 is a sectional view taken along line 6—6 of FIG. 2 showing a cutter device for severing the contact element welded onto the spring metal stock;

FIG. 7 is a sectional view taken along line 8—8 of FIG. 4 depicting the actuating mechanism for the cutter device shown in FIG. 6; and FIGS. 8, 9, and 10 are enlarged fragmentary top views showing the cutter device and a collet during various positions assumed during the welding and severing of the contact element onto the spring metal stock.

Figure 4:
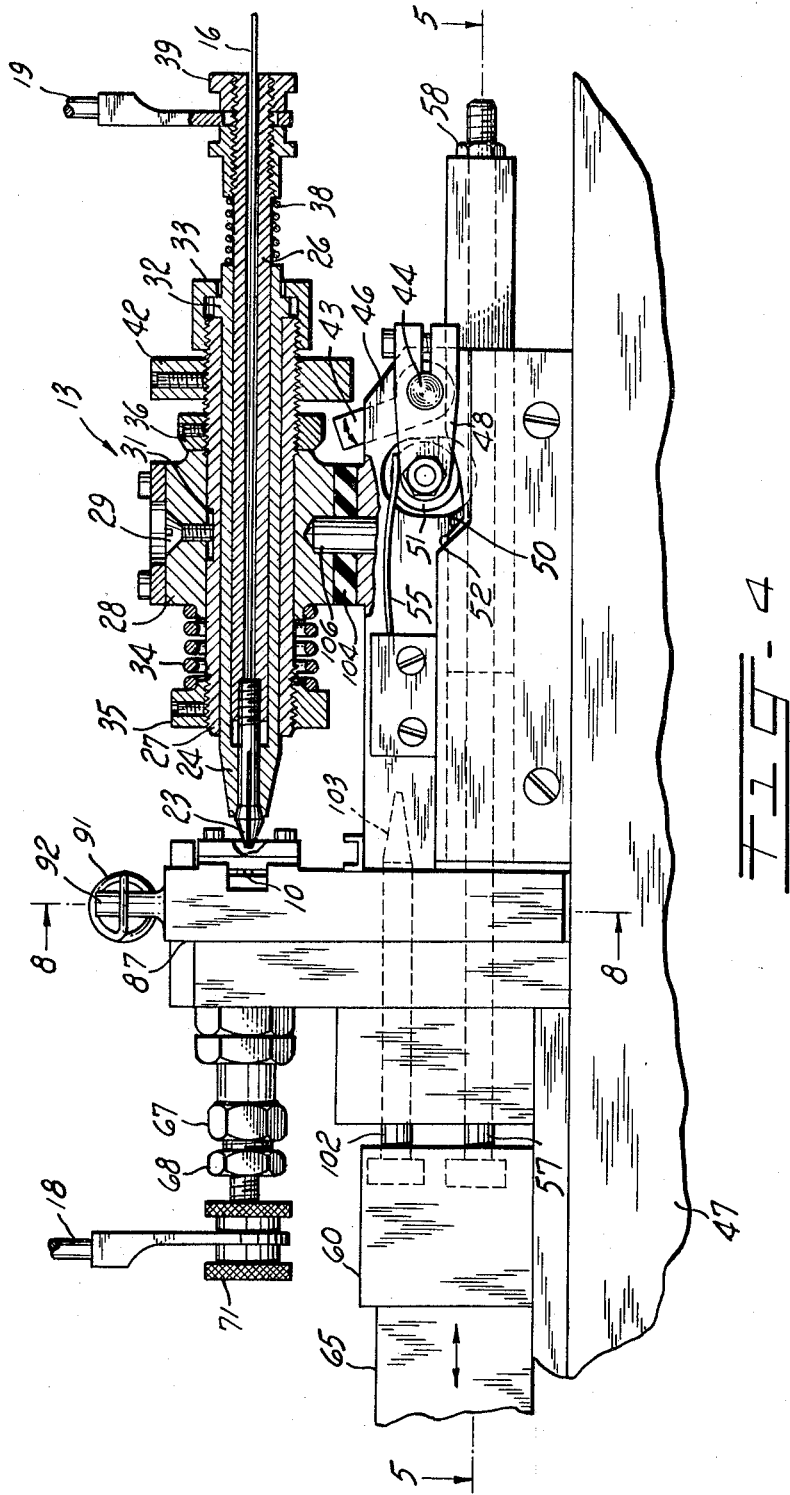
FIG. 4 is a side elevational view of one of a pair of welding heads shown in FIG. 2 in a forward or welding position.

Referring to FIG. 1 there is shown a strip of flat, spring metal stock 10 which may be constructed of Phosphor bronze and onto which it is desired to weld contact elements 11 of a precious or semiprecious material, such as palladium or gold alloys. In general referring to FIG. 2 the spring metal stock 10 is cyclically advanced by a feed mechanism 12 past a pair of welding heads 13 and 14. These welding heads are operated following each feed of the stock 10 to advance strips 16 and 17 of contact metal into engagement with upper and lower sections of the strip 10. Welding current is applied through connections or leads 18 and 19 to weld the ends of the strips 16 and 17 onto the spring metal stock 10. Following the welding operation, the welding heads 13 and 14 are withdrawn to move the stock 10 against a pair of cutting devices 21 and 22 which are then simultaneously operated to sever the contact metal strips 16 and 17, leaving contacts 11 welded to longitudinally spaced top and bottom face sections of the stock 10.

Considering now the details of construction of one of the welding heads 13 and 14, both of which are substantially identical except that one is mounted a little higher than the other so that the contacts 11 are welded to top and bottom face sections of the stock 10, the head 13 (see FIGS. 3 and 4) includes a split collet 23 for gripping and advancing the strip 16. This collet is slidably mounted within the tapered nose of a spindle-like tube 24 and is threadably attached to a hollow draw rod 26 through which the contact metal strip 16 passes. Surrounding the tube 24 is a threaded sleeve 27 slidably mounted within a bore formed in a boss 28. Extremes of movement of the tube 24 are limited by a set screw 29 extending into a longitudinal slot 31 formed in the sleeve 27. The spindle-like tube 24 is locked in position by engagement of a flange 32 by a cap nut 33 threadably mounted on the rear portion of the threaded sleeve 27. The sleeve 27 is urged toward the left by a spring 34 engaging and pressing a nut 35 screwed onto the forward or leftward end of the sleeve 27. A second nut 36 limits movement of the sleeve 27, within the forward extreme by the set screw 29 and slot 31, by engaging the rear face of the boss 28. The draw bar 26 is urged to move toward the right by a spring 38 bearing against the rear end of the sleeve 24 and a terminal nut 39 connected to a source of welding energy by the lead 19.

Movement of the sleeve 27, tube 24, and collet 23 is controlled by a third or actuator nut 42 that may be selectively engaged by a dog 43 connected to a pivot shaft 44 extending through a side wall of a frame 46 attached to a base 47. Mounted on the other end of the shaft 44 is an arm 48 having rotatably mounted on its free end a cam followed roller 51 riding on the upper face of a slide cam bar 52. The slide cam bar 52 is reciprocated to move a cam notch 50 past the cam follower roller 51. The cam follower roller is urged by a spring 55 to follow the top surface of the cam bar. When the notch is presented to the cam follower roller 51, this roller moves down to pivot the dog 43 in a counterclockwise direction. The dog 43 tends to move away from the nut 42, and as a result, the spring 34 expands to slide the sleeve 27, the tube 24, and the collet 23 to advance a section of strip material 16 into engagement with the spring metal stock 10.

Referring now to FIGS. 2 and 5, there is shown a slide block 60 mounted for movement within side plates of the frame 46. A bar 65 extends from the rear face of the slide block 60 and has mounted thereon a rotatable cam follower 53 riding within a cam track 54 formed in a side face of the cam 56 mounted on a shaft 75. Referring particularly to FIG. 5, a pair of headed rods 57 are fitted within two T-slots 58 formed in the block 60. Again considering only one rod 57 and the connecting mechanism because the other rod and connecting mechanism are substantially identical, the right-hand end of the headed rod 57 is threaded to receive a nut 72 which locks an arm 59 against a second nut-like member 61. Arm 59 is attached to the slide cam bar 52 so that reciprocation of the slide block 60 is imparted through the rod 57 and the arm 59 to the slide cam bar 52 to effectuate the reciprocation of the collet 23 to advance and retract the contact metal strip 16.

Referring back to FIG. 2 there is, positioned in alignment with the welding heads 13 and 14, a pair of welding electrode devices 62 and 63 of identical construction. Welding electrode device 63 comprises an anvil plunger 64 which is slidably mounted in a bored plate 66 secured between a pair of strip guide sections of the frame 46 (see FIG. 3). A pair of concentric nut-like members 67 and 68 provide a chamber for receiving a flange 69 of the anvil plunger 64 which bears against a compressed spring 70. An extension of the anvil plunger 64 is threaded to receive a terminal nut 71 which is connected to the lead 18.

Considering now the facilities for severing the contact metal strip 16 following the feeding and welding operations, there is provided the pair of cutter devices 21 and 22 of substantially identical construction. The cutter device 21 includes a pair of severing blades 81 and 82 (see FIG. 6) mounted by adjusting screws 85 on jaw frames 83 and 84 which in turn are connected to a pair of actuator levers 86 and 87 (see also FIG. 7) pivoted about stud shafts 88 and 89. The levers 86 and 87 are urged together by a spring 91 interconnecting posts 92 and 93 extending from the levers 86 and 87. As shown in FIG. 7, the levers 86 and 87 have inwardly projecting bosses 94 and 96 that are slotted and bored to receive shafts 97 and 98 and rollers 99 and 101. These rollers 99 and 101 are selectively engaged by a cutter actuator rod 102 (see also FIGS. 3 and 4) having a tapered tip 103. The rod 102 has a head formed on its left or rear end which fits within a T-slot formed in the slide block 60.

When the slide block 60 advances toward the right, as viewed in FIGS. 3 and 4, the cutter blades 81 and 82 are pivoted apart to permit the advance of the split collet 23 and the gripped projecting end of the contact metal strip 16. When a welding operation is completed and the collet withdrawn, then the tapered end 103 of the rod 102 moves away from the rollers 99 and 101 to permit the spring 91 to move the levers 86 and 87 and the cutter blades 81 and 82 to sever the welded end of the strip 16.

It will be noted from an examination of FIGS. 3 and 4 that the boss 28 is positioned on an insulator plate 104 through which project stud dowels 106 also constructed of insulating material. The dowels 106 extend down into a section of the frame 46 to lock the boss 28 against movement. It will be noted that upon advance of the welding heads 13 and 14 and the disengagement of the dog 43 from the actuator nut 42, (see FIG. 4), the welding heads are electrically insulated from the frame 46 and base 47.

Considering now one cycle of operation of the welding apparatus, the spring metal stock 10 is engaged and pushed forward by a feed pawl 111 (see FIG. 2) of the feed device 12. The feed pawl is connected to a slide yoke 112 moved by roller 113 attached to a lever 114 having mounted on its trailing end a cam follower roller 116 riding on a lobed face cam 117 mounted on shaft 75. As the cam 117 rotates a lobed portion engages and pivots roller 116 and lever 114 to advance the slide yoke 112 and feed pawl 111. The advance of the feed pawl 111 and stock 10 positions sections thereof in alignment with the collets 23 of respective heads 13 and 14 to longitudinally spaced, upper and lower contact elements 11.

Rotation of the cam 56 moves the slide block 60 toward the right so that the tapered end 103 of the rod 102 advances to engage the rollers 99 and 101 and thus pivot the levers 86 and 87 to separate the cutter blades 81 and 82. Further advance of the slide block 60 moves the slide cam bar 52 to advance the notch 50, whereupon the cam follower roller 51 moves into the notch to pivot the arm 48 and the dog 43. The dog 43 moves away from the actuator nut 42 to allow the spring 34 to expand and advance the sleeve 27, the tube 24, and the collet 23 toward the left.

The tapered nose on the tube 24 holds the split collet closed to grip the contact metal strip 16 to advance the projetcing end through the now open cutter blades 81 and 82 into engagement with the spring metal stock 10, as illustrated in FIG. 8. As the leading end of contact meal 16 engages spring metal stock 10, the spring metal stock is forced toward the left as viewed in FIGS. 2, 3, 4 and 8 to move against the anvil plunger 64 to compress spring 70. Another cam (not shown) controls a switch to connect the power supply to the leads 18 and 19 to effectuate a resistance weld between the tip of the engaged contact metal 16 and the spring metal stock 10. However, prior to application of the welding energy, the cam follower roller 51 rides within the bottom of the cam notch 50 so that the dog 43 is moved from engagement with the actuator nut 42. The forward movement of the actuator nut 42 is limited by engagement of the stop nut 36 with the righ-hand face of the boss 28. It may be thus appreciated that the time of application of electrical energy, the welding heads 13 and 14 are insulated from the frame 46 and base 47 of the overall machine. During the welding operation, and the melting of the contact metal 16, the spring 34 continues to expand to advance the collet 23. However, the advance of the collet is limited by the stop nut 36 which will engage the boss 28 to preclude the engagement of the actuator nut 42 during the application of welding current.

The cam 56, upon further rotation, starts to move the slide block 60 toward the left, whereupon the cam follower roller 51 rides up out of the notch 50 to pivot the dog 43 into engagement with the actuator nut 42 so that the sleeve 27, the tube 24, and the collet 23 move toward the right. The collet, still gripping the contact metal 16, moves the welded spring metal stock 10 against the left-hand or forward face of the cutter blades 81 and 82, as illustrated in FIGS. 6 and 9. Further movement of the slide block 60 toward the left further pivots the cam follower roller 51 and the dog 43 so that now the actuator nut 42 moves the sleeve 27 and the tube 24 further toward the right. The nose of tube 24 moves away from the now stationary split collet 23 so that the collet 23 releases the contact metal strip 16 and then slides relative thereto. As soon as the collet 23 releases the contact metal strip 16, the movement of the tube 24 will be transmitted through the spring 38 and the nut 39 to withdraw the collet 23 relative to contact metal strip 16 in anticipation of gripping another section of the strip during the next succeeding cycle of operation of the welding heads.

During withdrawal of the welding heads 13 and 14 and movement of the welded spring metal stock 10 toward the right, the spring 70 (see FIG. 2) is rendered effective to act on the anvil plunger 64 to push the plunger toward the right and thus push the stock 10 into engagement with the left-hand face of the cutter blades 81 and 82.

Further movement of the slide block 60 toward the left withdraws the tapered nose 103 of rod 102 (see FIGS. 3 and 6) from between the rollers 99 and 101 so that the levers 86 and 87 move together under the urging of the spring 91 to advance the cutter blades 81 and 82 toward each other to sever the welded end of the contact metal strip 16. It may be thus appreciated that the position of the severing edges of cutter blades determines the length of the severed contact 11 welded onto spring metal stock 10. Upon removal of screws 85, these blades may be readily replaced by other blades having severing edges 112 and 113 positioned at different distances relative to the front face of the blades. Thus, longer or shorter lengths of contact metal strip may be attached to the spring metal stock 10. Attention is also directed to the shape of the severing edges, which are double beveled to leave a projecting point on the severed ends of the contact strip metal 16. This pointed end of the strip 16 insures a high resistance contact with the stock 10 so that the welding energy is dissipated at the point where the weld is to be made.

The collet 23, when worn, may be easily replaced by merely removing nut 39 and the draw rod 26 which is threaded onto the end of the collet 23. The extent of advance of the welding head may be easily controlled by selectively positioning of the stop nut 36. Further, the pressure exerted on the contact metal strip 16 may be adjusted by merely turning the nut 36 to increase or decrease the force exerted by the compression spring 34.

Following attachment of the precious metal contacts 11 to the spring metal stock 10, the metal contacts may be shaped in a forming press, and then the stock severed into lengths to make contact springs for use in relays or switch blades for use in other circuit makers and breakers.

It is to be understood that the above-described arrangements of mechanism and construction of elemental parts are simply illustrative of an application of the principles of the invention and that many other modifications may be made within the scope and spirit thereof.

What is claimed is:

1. In an apparatus for welding a length of contact material onto a strip:
   an anvil electrode for freely supporting said strip;
   means for frictionally gripping said contact material with a length of said material projecting therefrom;
   means for moving said gripping means to advance said projecting gripped material toward and away from said anvil electrode to engage the end of said gripped material with said strip;
   means operated upon engagement of said length of material with said strip for applying electrical energy through said gripping means, said projecting length of material, the engaged strip and said anvil electrode to weld the gripped material onto said strip, whereafter said gripped welded material withdraws the strip upon movement of said gripping means away from said anvil electrode;
   a pair of movably mounted cutting blades spaced apart and interposed between said gripping means and said anvil electrode for engaging and holding said strip so that said gripping means frictionally slides along said material; and
   means operated upon completion of said movement of said gripping means away from the anvil electrode for moving said cutters toward each other to sever said material.

2. In an apparatus for welding the end of a first strip onto a second strip:
   a first electrode for supporting the second strip;
   a second electrode means having a releasable collet for gripping and moving a projecting end of the first strip into engagement with said supported second strip;
   a stationary frame having a pair of normally open cutter blades mounted thereon for movement toward each other to intersect the path of movement of said first strip;
   means for advancing and retracting said second electrode means and said collet, to advance said first strip through said open blades into engagement with said second strip;
   means rendered effective upon engagement of the first strip with the second strip for applying welding energy to weld the end of said first strip onto said second strip whereupon subsequent retraction of said second electrode means withdraws the first strip through the blades and moves the welded second strip against said blades to release said collet; and
   means rendered effective upon retraction of said second electrode means for moving said cutter blades toward and away from each other.

3. In an apparatus of type set forth in claim 2, wherein: means resiliently mount the first electrode for movement in a first direction upon engagement and advancement of the first strip with the second strip and in opposite directions upon retraction of said second electrode means to urge said welded second strip against said cutter blades.

4. In an apparatus for welding a contact element onto a strip of spring metal:
means for supporting said strip of metal;
a boss having a bore therethrough aligned with said supporting means;
a sleeve threaded at both ends and separated by a smooth section which rides within said bore;
a first nut threaded on a forward end of said sleeve;
a spring interposed between said boss and first nut for urging said sleeve forward;
a collet;
a tube mounted within said sleeve and having a tapered inner nose section on a forward end for receiving and acting on said collet;
said tube having a flange on the rearward end thereof;
means for urging said collet within said nose section of the tube to grip a strip of contact material with the end projecting from the collet;
a cap nut threaded on the rearward end of said sleeve for locking said tube within said sleeve;
an actuator nut threaded on the rearward section of said sleeve, and interposed between said boss and cap nut;
a movably mounted dog for engaging said actuator nut to hold said sleeve in position to compress said spring;
means for cyclically moving said dog to move away from said actuator nut to render said spring effective to advance said sleeve, tube and collet to advance said projecting end into engagement with said strip of spring metal; and
means for applying welding current through said engaged strips.

5. In an apparatus for welding a contact element onto a strip of spring metal as defined in claim 4 wherein:
a second nut is mounted on said sleeve between said boss and said actuator nut for engaging said boss and limiting advance of said sleeve, tube and collet so that said dog disengages said actuator nut prior to said application of welding current.

6. In a welding apparatus:
a frame;
an insulating member on said frame;
a boss mounted on said insulating member;
a first electrode means slidably mounted on said boss for carrying a wire-like member;
a second electrode means for supporting a strip onto which said wire-like member is to be welded;
means for urging said first electrode means to advance said wire-like member into engagement with said strip;
a dog engaging said electrode means for holding said electrode means from advancing;
an actuator slide mounted in said frame having a cam surface for moving said dog to render said urging means effective to move said first electrode means and then for moving said dog from engagement with said first electrode means;
means for moving said slide to move said dog to release said first electrode means and then disengage said dog from said first electrode means; and
means rendered effective following disengagement of said dog and said first electrode means for applying welding energy to said first and second electrode means.

7. In a machine for welding lengths of a first strip onto continuous second strip:
a releasable collet for gripping and advancing said first strip toward and into engagement with said second strip;
a slide device;
means for cyclically reciprocating said slide device;
means on said slide device for cyclically controlling a foreward and return movement of said collet toward and away from said second strip;
means rendered effective upon forward movement of said collet to move said first strip into engagement with said second strip for applying welding energy through said strips at the point of engagement to weld the strips together;
a pair of moveable cutters positioned to span the path of movement of said collet for engaging said welded strip upon return movement of said collet to release and allow said collet to move relative to said first strip;
means on said slide device rendered effective upon continued movement of said slide device for operating said cutters to move toward and sever the welded first wire; and
means operated following operation of said cutter for advancing said second strip to move another section into the path of movement of said collet.

8. In a welding apparatus:
a frame;
a boss having a bore therethrough;
electrically insulating means mounting said boss on said frame;
an anvil means for supporting a first article in alignment with said bore;
collet means slidably mounted in said bore for gripping a second article;
means for urging said collet means to advance the gripped second article toward the first article;
a dog for engaging and holding said collet means against the effect of said urging means to hold the second article from the first article;
means for moving said dog to render said urging means effective to advance the second article into engagement with the first article whereupon continued movement of said means disengages said dog from said collet means; and
means for applying welding energy through said disengaged collet means, through the engaged first and second articles and said anvil means.

References Cited

UNITED STATES PATENTS

| | | | |
|---|---|---|---|
| 2,316,597 | 4/1943 | Kershaw | 219—107 X |
| 3,114,828 | 12/1963 | Gannoe | 219—107 X |
| 3,351,103 | 11/1967 | Grainger | 228—44 |
| 3,382,575 | 5/1968 | Gannoe | 219—79 |

JOSEPH V. TRUHE, Primary Examiner

B. A. STEIN, Assistant Examiner

U.S. Cl. X.R.

219—79, 107; 228—44